US012800830B2

(12) United States Patent
Tanaka et al.

(10) Patent No.: US 12,800,830 B2
(45) Date of Patent: Nov. 17, 2026

(54) HYBRID PLASMONIC WAVEGUIDE AND METHOD FOR HIGH DENSITY PACKAGING INTEGRATED WITH A GLASS INTERPOSER

(71) Applicant: Intel Corporation, Santa Clara, CA (US)

(72) Inventors: Hiroki Tanaka, Gilbert, AZ (US); Brandon C. Marin, Gilbert, AZ (US); Robert Alan May, Chandler, AZ (US); Suddhasattwa Nad, Chandler, AZ (US); Benjamin Duong, Phoenix, AZ (US)

(73) Assignee: Intel Foundry IP LLC, Santa Clara, CA (US)

( * ) Notice: Subject to any disclaimer, the term of this patent is extended or adjusted under 35 U.S.C. 154(b) by 178 days.

(21) Appl. No.: 17/957,600

(22) Filed: Sep. 30, 2022

(65) Prior Publication Data

US 2024/0111095 A1 Apr. 4, 2024

(51) Int. Cl.
*G02B 6/122* (2006.01)

(52) U.S. Cl.
CPC .................................. *G02B 6/1226* (2013.01)

(58) Field of Classification Search
None
See application file for complete search history.

(56) References Cited

U.S. PATENT DOCUMENTS 6,952,049 B1 10/2005 Ogawa et al.
8,872,349 B2 10/2014 Chiu et al.
9,740,079 B1 * 8/2017 Davids ................. G02B 6/1347
10,698,164 B2 6/2020 Psaila et al.
12,066,671 B2 * 8/2024 Tang ...................... G02B 6/125
2005/0012217 A1 1/2005 Mori et al.
2006/0169973 A1 8/2006 Isa et al.
2010/0187683 A1 7/2010 Bakir et al.
2010/0244230 A1 9/2010 Oi
2010/0316327 A1 * 12/2010 Montoya ................ G02F 1/011 427/163.2
2010/0320496 A1 12/2010 Nishi et al.
2011/0147059 A1 6/2011 Ma et al.
2011/0304999 A1 12/2011 Yu et al.
2014/0078704 A1 3/2014 Andry et al.
2014/0231986 A1 8/2014 Dubin
2014/0339705 A1 11/2014 Yee
2016/0043068 A1 2/2016 Ramachandran et al.
2016/0322290 A1 11/2016 Ma et al.
(Continued)

FOREIGN PATENT DOCUMENTS

CN 102820268 A 12/2012
WO 2017172677 A1 10/2017
WO 2019079625 A1 4/2019

*Primary Examiner* — Chad H Smith
(74) *Attorney, Agent, or Firm* — Akona IP PC

(57) ABSTRACT

A hybrid plasmonic waveguide and associated methods are disclosed. In one example, the electronic device includes combining an electromagnetic wave propagating in a waveguide with a high refractive index and a surface plasmon from a metal surface to create a hybrid plasmon wave in a low refractive index material separating the dielectric waveguide and metal surface. In selected examples, surface mounted hybrid plasmonic waveguides are shown. In selected examples hybrid plasmonic waveguides embedded in glass interposers are shown.

16 Claims, 6 Drawing Sheets

(56) References Cited

U.S. PATENT DOCUMENTS

| | | | |
|---|---|---|---|
| 2016/0374198 | A1 | 12/2016 | Kim et al. |
| 2018/0026666 | A1 | 1/2018 | Yun et al. |
| 2018/0102311 | A1 | 4/2018 | Shih |
| 2018/0294214 | A1 | 10/2018 | Aoki et al. |
| 2018/0344245 | A1 | 12/2018 | Knickerbocker et al. |
| 2019/0074240 | A1 | 3/2019 | Levesque, Jr. et al. |
| 2019/0124772 | A1 | 4/2019 | Stahr et al. |
| 2020/0027728 | A1 | 1/2020 | Wang et al. |
| 2020/0058567 | A1 | 2/2020 | Kim et al. |
| 2020/0203266 | A1 | 6/2020 | Iwai et al. |
| 2021/0118698 | A1 | 4/2021 | Sawadaishi |
| 2021/0257741 | A1 | 8/2021 | Flemming et al. |
| 2022/0375865 | A1 | 11/2022 | Pietambaram et al. |
| 2023/0093522 | A1 | 3/2023 | Ecton et al. |
| 2023/0187205 | A1 | 6/2023 | Wang et al. |
| 2024/0087971 | A1 | 3/2024 | Marin et al. |

* cited by examiner

HYBRID PLASMONIC WAVEGUIDE AND METHOD FOR HIGH DENSITY PACKAGING INTEGRATED WITH A GLASS INTERPOSER

TECHNICAL FIELD

Embodiments described herein generally relate to semiconductor and photonic devices. Selected examples include devices with photonic integrated circuits and optical waveguides.

BACKGROUND

Communication between semiconductor devices is challenging as devices become smaller, and as the amount of information communicated is ever increasing. One method of communication utilizes optical data, however, optical waveguides have challenges that make scaling below a certain dimension scale difficult. The examples described by the following disclosure address these concerns, and other technical challenges.

DESCRIPTION OF EMBODIMENTS

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

A dielectric waveguide with a high index of refraction can utilize total internal reflection to guide light a long distance with a low loss, but the light confinement is limited by diffraction limit. The diffraction limit can prevent the localization of electromagnetic waves into a nanoscale regime. A surface plasmon is confined near a metal surface and is not limited by diffraction but the metal may cause significant propagation loss.

Figure 1A:
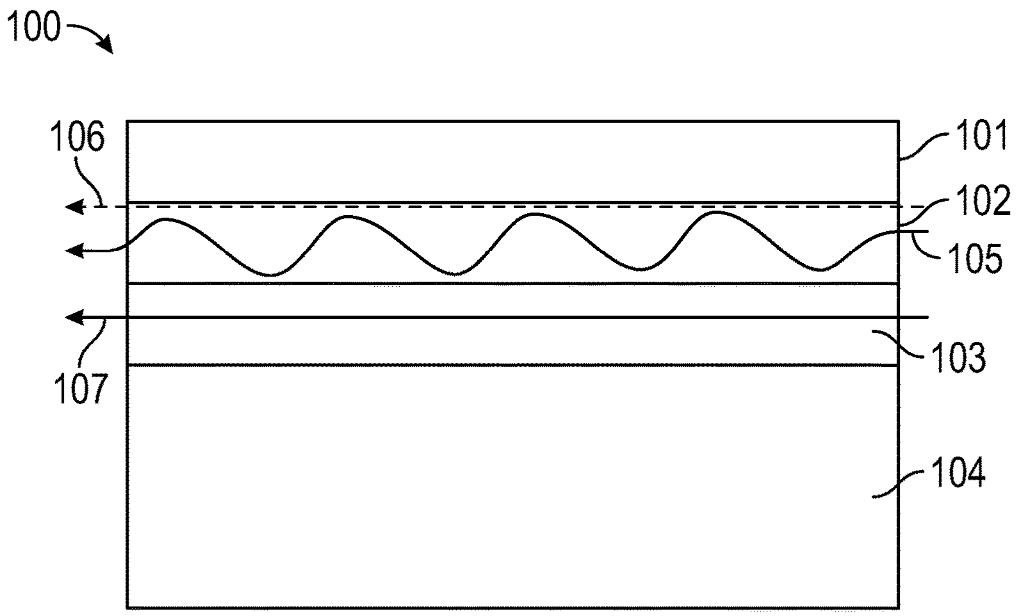
FIG. 1A shows a cross section view of a coupled wave in a hybrid plasmonic waveguide in accordance with some example embodiments.

FIG. 1A shows a hybrid plasmonic waveguide 100 according to one example that may include a metallic material layer 101, a first dielectric material layer 102, a second dielectric material layer 103, and a glass layer 104. The metallic material layer 101 can include a metal or metal alloy. In one example, the metallic material layer 101 includes a metal compound, such as titanium nitride. One example of a metallic material can include gold. One example of a metallic material can include silver. One example of a metallic material can include copper. One example of a metallic material can include aluminum.

The first dielectric material layer 102 can include a dielectric material with a low index of refraction. In one example, the first dielectric material layer includes at least one of bismuth, nitrogen, indium, and phosphorus. One example of a dielectric material with a low index of refraction can include a bismuth and oxygen compound such as bismuth oxide. One example of a dielectric material with a low index of refraction can include a silicon and oxygen compound such as silica. One example of a dielectric material with a low index of refraction can include a silicon and nitrogen compound such as silicon nitride. One example of a dielectric material with a low index of refraction can include an indium and phosphorous compound such as indium phosphide. In one example, the first dielectric material layer 102 includes material with an index of refraction between about 0.02 and about 3.5.

The second dielectric material layer 103 can include a dielectric material with a high index of refraction. In one example, the first dielectric material layer includes at least one of silicon, aluminum, gallium, and arsenic. One example of a dielectric material with a high index of refraction can include silicon. One example of a dielectric material with a high index of refraction can include an aluminum and gallium and arsenic compound such as aluminum gallium arsenide. One example of a dielectric material with a high index of refraction can include an indium and gallium and arsenic compound such as indium gallium arsenide. In one example, the second dielectric material layer 103 includes material with an index of refraction between about 3.5 and about 15.

One or ordinary skill in the art, having the benefit of the present disclosure, will recognize that the terms “high” and “low” index of refraction are relative to one another. In one example, a material chosen for the second dielectric material layer 103 need only have a higher index of refraction than a material chosen for the first dielectric material layer 102.

FIG. 1A further shows a propagating light wave 107 and a propagating plasmon 106. By placing the first dielectric material layer 102 with a low index of refraction between the metallic material layer 101 and the second dielectric material layer 103 with a high index of refraction, the hybrid plasmonic waveguide 100 can combine the propagating light 107 in the second dielectric material layer 103 and the surface plasmon 106 to create a coupled wave 105 which can be both highly confined in the first dielectric material layer 102 and propagate longer distances with low loss. In one example, the coupled wave 105 in the hybrid plasmonic waveguide 100 can propagate around 1.7 mm In one example, the coupled wave 105 can have propagation lengths around 20 mm with the right combination of refractive index, dimensions, and design.

Selected dimensions of a hybrid plasmonic waveguide 100 depend on the configuration and materials of the hybrid plasmonic waveguide 100. Generally, a thickness of the first dielectric material layer 102 is small relative to a thickness of the second dielectric material layer 103 to facilitate coupling between the metallic material layer 101 and second dielectric material layer 103. One example of a hybrid plasmonic waveguide 100 can have a width of 100 nm-10,000 nm. One example of a metallic material layer 101 can have a thickness of 80-100 nm. One example of a first dielectric material layer 102 can have a thickness of 5-50 nm. One example of a second dielectric material layer 103 can have a thickness of 300-2,000 nm.

Figure 1B:
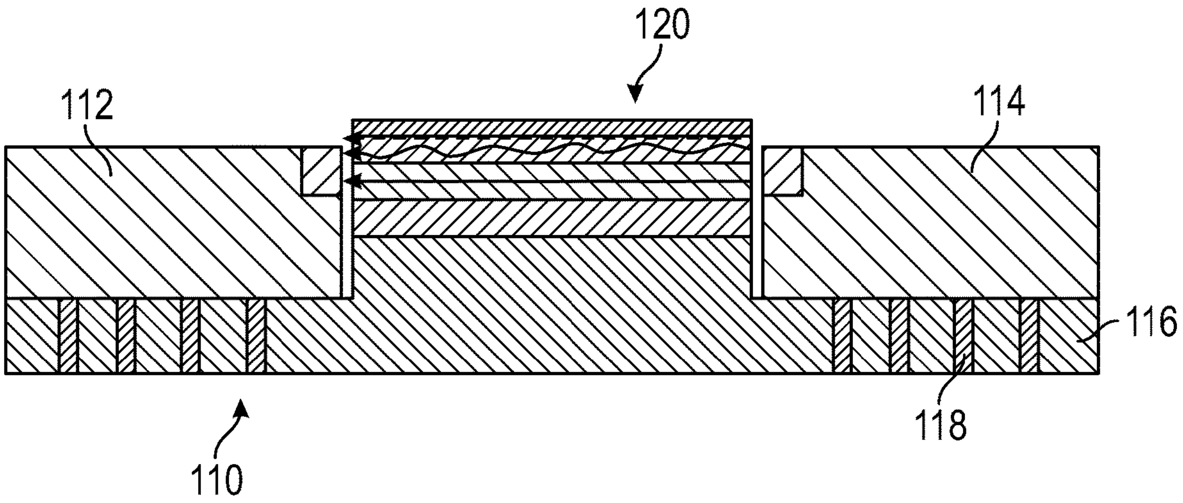
FIG. 1B shows a semiconductor device including a waveguide in accordance with some example embodiments.

FIG. 1B shows a semiconductor device 110 including a first die 112 and a second die 114. In one example, the first die 112 and/or the second die 114 include photonic integrated circuits. The first die 112 and the second die 114 are shown coupled to a substrate 116. In one example the substrate 116 includes one or more glass layers similar to glass layer 104 from FIG. 1A. In one example, the substrate 116 is an interposer. Examples of glass may include a silicate-based glass (e.g., lithium-silicate, borosilicate, aluminum silicate, etc.). In variations, the glass of a glass interposer or glass layer is a lower quality glass (e.g., glass made with soda lime), or a higher quality glass (e.g., glass made with fused silica).

In the example of FIG. 1B, the substrate 116 includes a number of interconnects 118 such as through glass vias. In one example, the through glass vias 118 include a metal such as copper. A hybrid plasmonic waveguide 120 similar to hybrid plasmonic waveguide 100 from FIG. 1A is shown coupled between the first die 112 and the second die 114. Although two dies are shown in the example of FIG. 1B, the invention is not so limited. Semiconductor devices with more than two dies that are interconnected by a hybrid plasmonic waveguide are also within the scope of the invention. Additionally, semiconductor devices with a single die, and an output from a hybrid plasmonic waveguide to an optical fiber coupling are also within the scope of the invention.

Figure 2A:
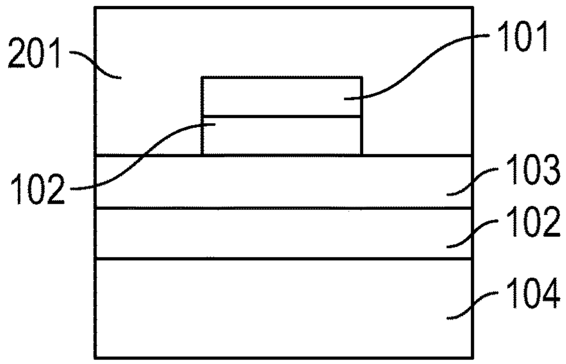
FIG. 2A-C shows a cross section view of a hybrid plasmonic waveguide in accordance with some example embodiments.
Figure 2B:
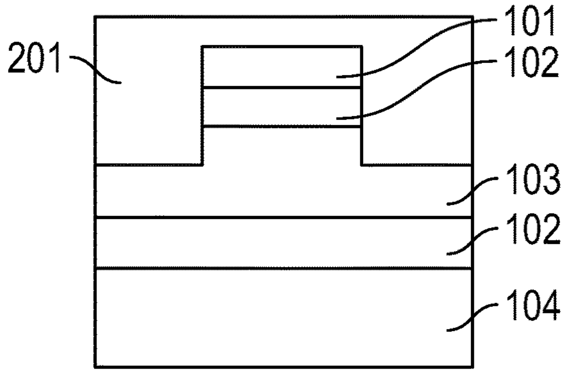
Figure 2C:
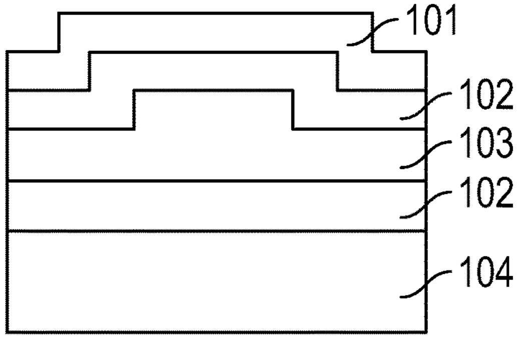
Figure 3A:
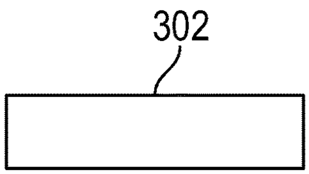
FIG. 3A-J shows a flow diagram of a method of manufacture of a hybrid plasmonic waveguide in accordance with some example embodiments.
Figure 3B:
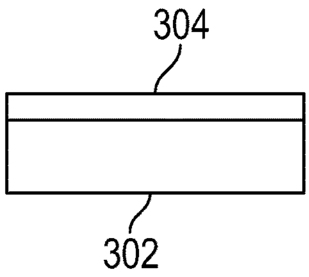
Figure 3C:
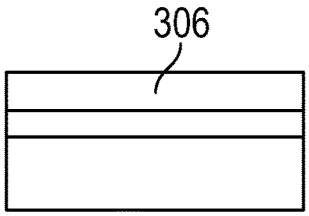
Figure 3D:
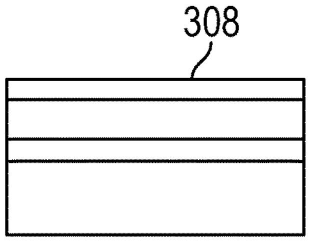
Figure 3E:
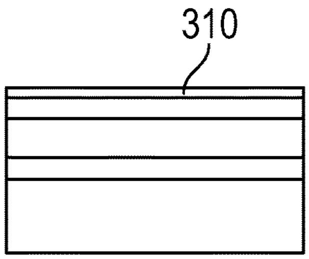
Figure 3F:
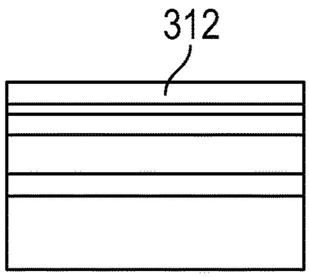
Figure 3G:
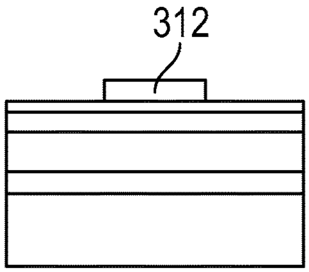
Figure 3H:
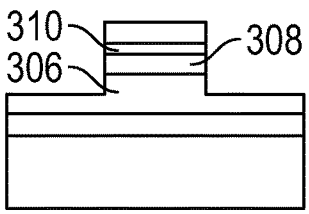
Figure 3I:
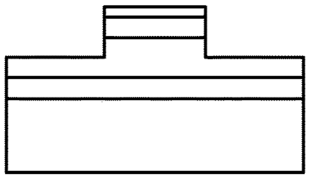
Figure 3J:
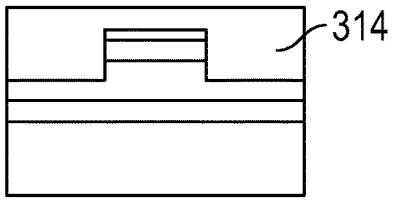

FIGS. 2A-2C show cross section views of some example hybrid plasmonic waveguide 100 configurations. FIG. 2A and FIG. 2B depict hybrid plasmonic waveguide 100 configurations that can include a polymer layer 201 encapsulating the hybrid plasmonic waveguide 100.

FIGS. 3A-3J show one example of a manufacturing flow used to form a hybrid plasmonic waveguide. In operation A glass substrate 302 is provided. In operation B, a low index material layer 304 is deposited in a layer above the glass substrate 302. The low index material layer 304 can include a material with a low index of refraction such as those listed above. In operation C, a high index layer 306 is layered over the low index material layer 304. The high index layer 306 can include a high index of refraction material such as those listed above. In operation D a second low index material layer 308 is layered over the high index layer 306. One method of layering can include plasma enhanced chemical vapor deposition. In operation E a metal layer 310 is layered over the second low index material layer 308. The metal layer 310 can include a metallic material such as those listed above. In operation F a resist 312 is coated or laminated onto the metal layer 310. In operation G portions of the resist 312 are removed to define the waveguide. One example of a method to remove the resist 312 can include using a e-beam lithography process. In operation H exposed portions of the metal layer 310 the second low index material layer 308 and the high index layer 306 are removed through a process such as etching. One example of a method of etching can include using reactive ion etching. In operation I the remaining resist 312 can be removed. In Operation J a protective layer 314 can be laminated or deposited on the waveguide. An example of the protective layer 314 can be a polymer layer.

In one example application a hybrid plasmonic waveguide 100 can connect a Photonic Integrated Circuit (PIC) to an optical fiber. In another example application a hybrid plasmonic waveguide 100 can connect one PIC to a second PIC. In both examples the hybrid plasmonic waveguide 100 can be integrated directly on a glass interposer.

Figure 4A:
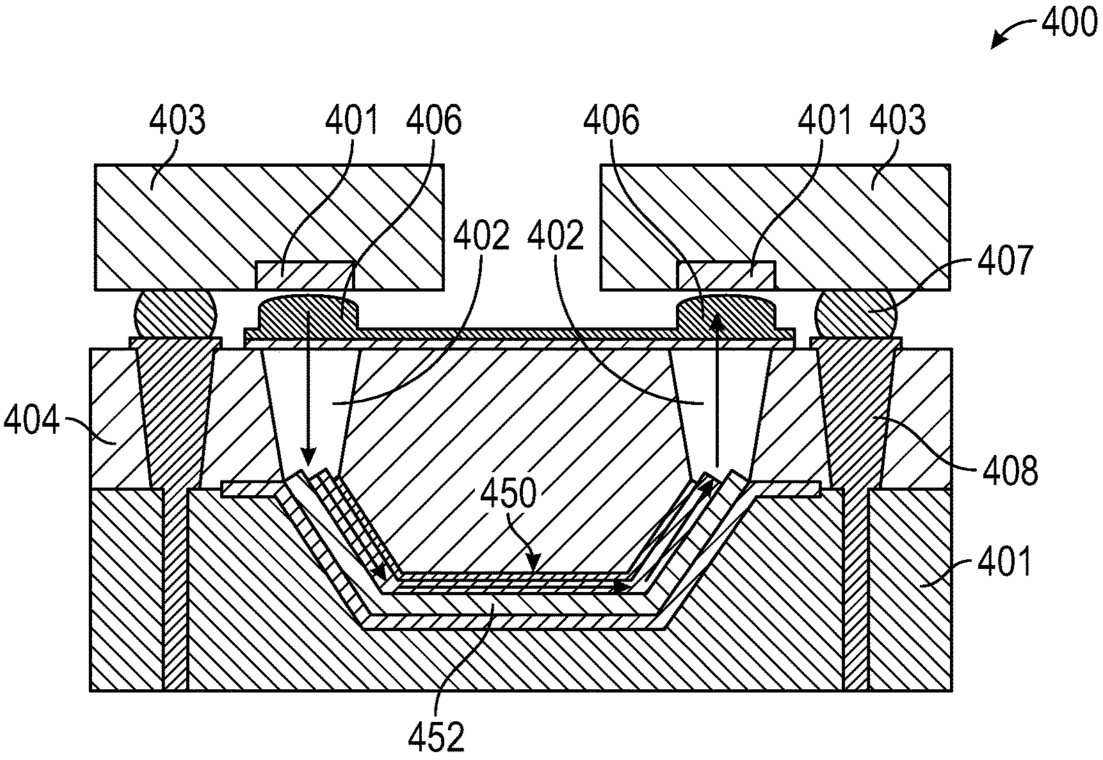
FIG. 4A shows a semiconductor device including a hybrid plasmonic waveguide in accordance with some example embodiments.

FIG. 4A shows an example of a semiconductor device 400 that includes an embedded hybrid plasmonic waveguide 450. In one example the hybrid plasmonic waveguide 450 includes layers 452 as described in FIGS. 1-3 above, including, but not limited to high and low index of refraction layers and metal layers. An example of an embedded hybrid plasmonic waveguide 450 can be used in conjunction with one or more vias 402 to transmit a signal from a detector or laser diode 401 of one PIC die 403 to the detector or laser diode 401 another PIC die 403. One example of an embedded hybrid plasmonic waveguide 450 can have the PIC die 403 attached to a glass micro-lens 406 and solder bump plating 407 over copper conductors 408. An embedded hybrid plasmonic waveguide 450 can provide more space for PIC 403 or Electronic Integrated Circuit (EIC) dies.

In one example the vias 402 include air vias. In one example the vias 402 include light transmissible polymer vias. In one example the embedded hybrid plasmonic waveguide 450 is formed within a dielectric layer 404 that is formed over a glass layer 401 such as a glass substrate or a glass interposer. In one example, the hybrid plasmonic waveguide 450 can be fabricated in a glass cavity with 60-80 degree taper angles to help couple light from the PIC 403 into the hybrid plasmonic waveguide 450.

Figure 4B:
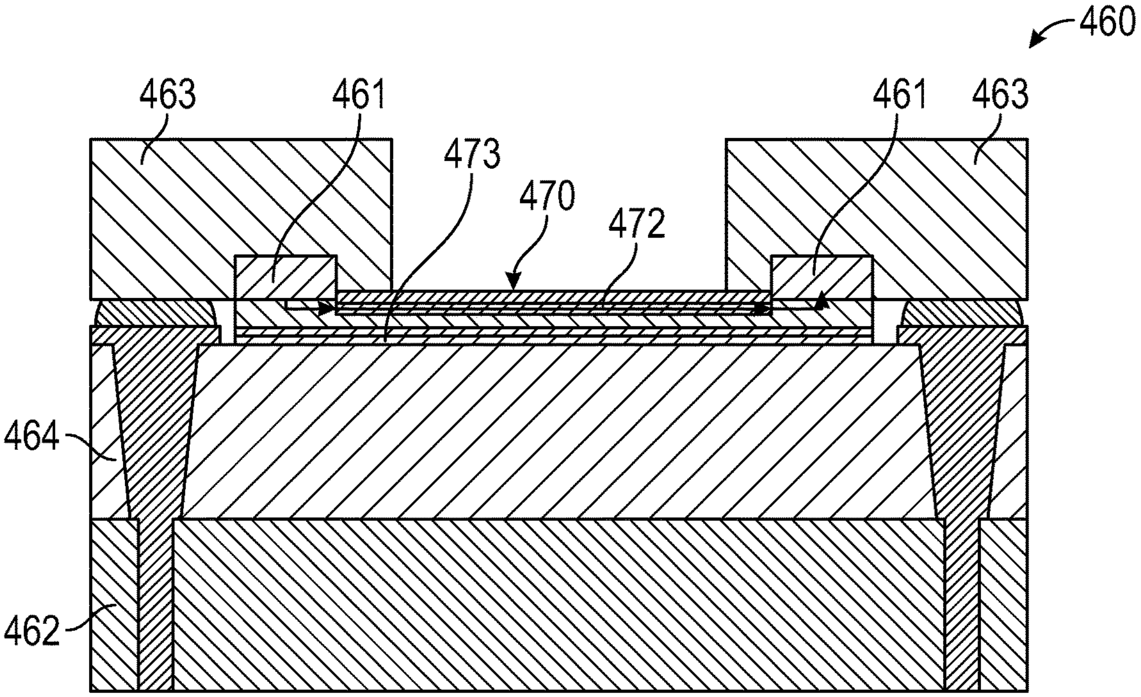
FIG. 4B shows another semiconductor device including a hybrid plasmonic waveguide in accordance with some example embodiments.
Figure 5A:
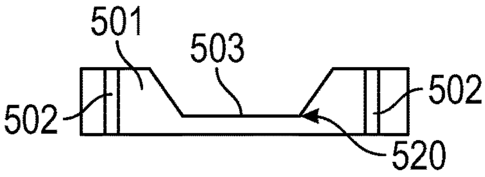
FIG. 5A-I shows a flow diagram of a method of manufacture of a hybrid plasmonic waveguide in accordance with some example embodiments.
Figure 5B:
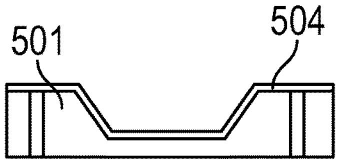
Figure 5C:
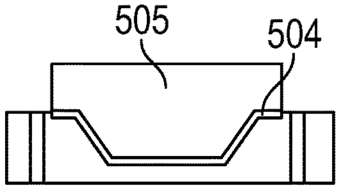
Figure 5D:
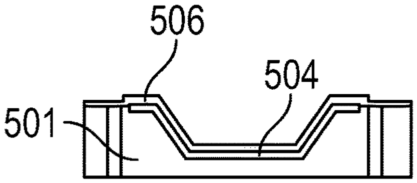
Figure 5E:
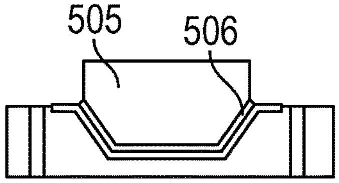
Figure 5F:
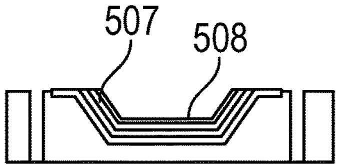
Figure 5G:
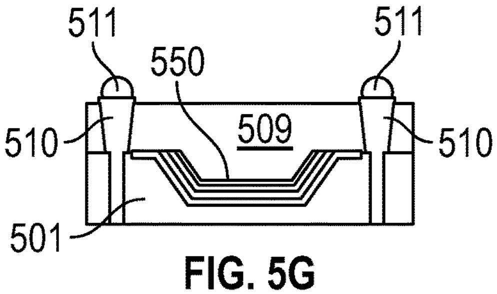
Figure 5H:
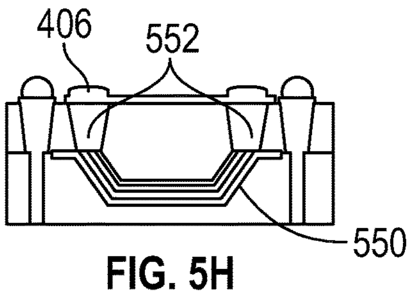
Figure 5I:
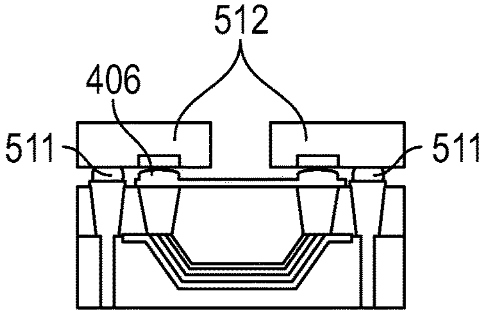

FIG. 4B shows another example of a semiconductor device 460 that includes an embedded hybrid plasmonic waveguide 470. In one example the hybrid plasmonic waveguide 470 includes layers 472 as described in FIGS. 1-3 above, including, but not limited to high and low index of refraction layers and metal layers. An example of an embedded hybrid plasmonic waveguide 472 can be used to transmit a signal from a detector or laser diode 461 of one PIC die 463 to the detector or laser diode 461 another PIC die 463. In one example the embedded hybrid plasmonic waveguide 470 is formed within a dielectric layer 464 that is formed over a glass layer 462 such as a glass substrate or a glass interposer. In one example, the hybrid plasmonic waveguide 472 is formed separately from the dielectric layer 464 and glass layer 462. In this example, the hybrid plasmonic waveguide 472 may be placed on the dielectric layer 464 and adhered with an adhesive layer 473 located between the hybrid plasmonic waveguide 472 and the dielectric layer 464.

FIG. 5 shows one example of a manufacturing flow used to form an embedded hybrid plasmonic waveguide. In operation A, glass layer 501 is provided. The glass layer 501 can include copper or other metal plating 502, and a cavity 503 with 60-80 degree taper angles 520. In operation B, a low index material layer 504 is deposited in a layer above the glass layer 501. The low index material layer 504 can include a material with a low index of refraction such as those listed above. In operation C, a resist 505 is coated or laminated onto the low index material layer 504, portions of the resist 505 are removed by a process such as e-beam lithography to define the waveguide, and the exposed portions of the low index material layer 504 are removed by a process such as reactive ion etching. In operation D, the remaining portions of the resist 505 are stripped and a high index layer 506 is layered over the low index material layer 504 and exposed portions of the glass interloper 501. In operation E, a resist 505 is coated or laminated onto the high index layer 506. Portions of the resist 505 are removed by a process such as e-beam lithography to define the waveguide, and the exposed portions of the high index layer 506 are removed by a process such as reactive ion etching. In operation F, the remaining portions of the resist 505 are stripped a second low index material layer 507 and a metal layer 508 are formed. In operation G, a surface layer 509 is laminated over the glass interloper 501 and embedded hybrid plasmonic waveguide 550. One example of a 509 includes a filler free dielectric material to prevent light scattering. Laser drilling or other via formation processes are used to create holes in the surface layer 509 for copper patterning 510 and solder bump plating 511. In operation H, laser drilling is used to create air vias 552 similar to air vias 402 described above. A glass micro-lens 406 may be added. In operation I, PIC dies 512 are mounted on the glass micro-lens 406 and solder bump plating 511. In another example, the air vias 552 can be replaced with polymer waveguides as described above, and the glass micro-lens 406 can be replaced with a polymer micro-lens.

Figure 6:
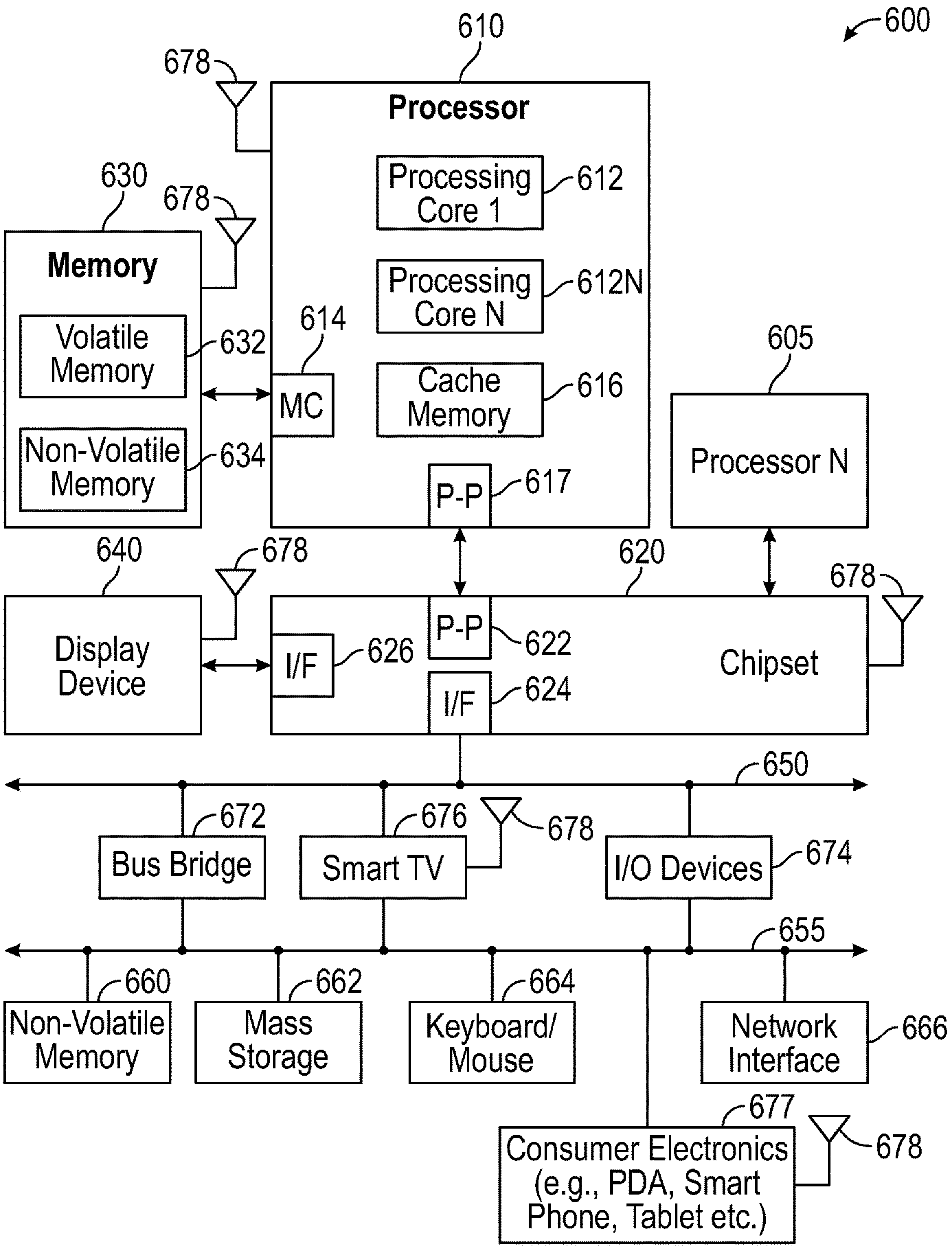
FIG. 6 shows a system that may incorporate hybrid plasmonic waveguides and methods, in accordance with some example embodiments.

FIG. 6 illustrates a system level diagram, depicting an example of an electronic device (e.g., system) that may include a hybrid plasmonic waveguide for high density semiconductor packaging and/or methods described above. In one embodiment, system 600 includes, but is not limited to, a desktop computer, a laptop computer, a netbook, a tablet, a notebook computer, a personal digital assistant (PDA), a server, a workstation, a cellular telephone, a mobile computing device, a smart phone, an Internet appliance or any other type of computing device. In some embodiments, system 600 includes a system on a chip (SOC) system.

In one embodiment, processor 610 has one or more processor cores 612 and 612N, where 612N represents the Nth processor core inside processor 610 where N is a positive integer. In one embodiment, system 600 includes multiple processors including 610 and 605, where processor 605 has logic similar or identical to the logic of processor 610. In some embodiments, processing core 612 includes, but is not limited to, pre-fetch logic to fetch instructions, decode logic to decode the instructions, execution logic to execute instructions and the like. In some embodiments, processor 610 has a cache memory 616 to cache instructions and/or data for system 600. Cache memory 616 may be organized into a hierarchal structure including one or more levels of cache memory.

In some embodiments, processor 610 includes a memory controller 614, which is operable to perform functions that enable the processor 610 to access and communicate with memory 630 that includes a volatile memory 632 and/or a non-volatile memory 634. In some embodiments, processor 610 is coupled with memory 630 and chipset 620. Processor 610 may also be coupled to a wireless antenna 678 to communicate with any device configured to transmit and/or receive wireless signals. In one embodiment, an interface for wireless antenna 678 operates in accordance with, but is not limited to, the IEEE 802.11 standard and its related family, Home Plug AV (HPAV), Ultra Wide Band (UWB), Bluetooth, WiMax, or any form of wireless communication protocol.

In some embodiments, volatile memory 632 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. Non-volatile memory 634 includes, but is not limited to, flash memory, phase change memory (PCM), read-only memory (ROM), electrically erasable programmable read-only memory (EEPROM), or any other type of non-volatile memory device.

Memory 630 stores information and instructions to be executed by processor 610. In one embodiment, memory 630 may also store temporary variables or other intermediate information while processor 610 is executing instructions. In the illustrated embodiment, chipset 620 connects with processor 610 via Point-to-Point (PtP or P-P) interfaces 617 and 622. Chipset 620 enables processor 610 to connect to other elements in system 600. In some embodiments of the example system, interfaces 617 and 622 operate in accordance with a PtP communication protocol such as the Intel® QuickPath Interconnect (QPI) or the like. In other embodiments, a different interconnect may be used.

In some embodiments, chipset 620 is operable to communicate with processor 610, 605N, display device 640, and other devices, including a bus bridge 672, a smart TV 676, I/O devices 674, nonvolatile memory 660, a storage medium (such as one or more mass storage devices) 662, a keyboard/mouse 664, a network interface 666, and various forms of consumer electronics 677 (such as a PDA, smart phone, tablet etc.), etc. In one embodiment, chipset 620 couples with these devices through an interface 624. Chipset 620 may also be coupled to a wireless antenna 678 to communicate with any device configured to transmit and/or receive wireless signals. In one example, any combination of components in a chipset may be separated by a continuous flexible shield as described in the present disclosure.

Chipset 620 connects to display device 640 via interface 626. Display 640 may be, for example, a liquid crystal display (LCD), a light emitting diode (LED) array, an organic light emitting diode (OLED) array, or any other form of visual display device. In some embodiments of the example system, processor 610 and chipset 620 are merged into a single SOC. In addition, chipset 620 connects to one or more buses 650 and 655 that interconnect various system elements, such as I/O devices 674, nonvolatile memory 660, storage medium 662, a keyboard/mouse 664, and network interface 666. Buses 650 and 655 may be interconnected together via a bus bridge 672.

In one embodiment, mass storage device 662 includes, but is not limited to, a solid state drive, a hard disk drive, a universal serial bus flash memory drive, or any other form of computer data storage medium. In one embodiment, network interface 666 is implemented by any type of well-known network interface standard including, but not limited to, an Ethernet interface, a universal serial bus (USB) interface, a Peripheral Component Interconnect (PCI) Express interface, a wireless interface and/or any other suitable type of interface. In one embodiment, the wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 6 are depicted as separate blocks within the system 600, the functions performed by some of these blocks may be integrated within a single semiconductor circuit or may be implemented using two or more separate integrated circuits. For example, although cache memory 616 is depicted as a separate block within processor 610, cache memory 616 (or selected aspects of 616) can be incorporated into processor core 612.

To better illustrate the method and apparatuses disclosed herein, a non-limiting list of embodiments is provided here:

Example 1 includes a photonic semiconductor package. The photonic semiconductor package includes a metallic material layer, a first dielectric material layer including at least one of bismuth, nitrogen, indium, and phosphorus, a second dielectric material layer including at least one of silicon, aluminum, gallium, and arsenic, wherein the first dielectric material layer is coupled between the metallic material layer and the second dielectric material layer.

Example 2 includes the photonic semiconductor package of example 1, wherein the first dielectric material includes a first index of refraction, and the second dielectric material includes a second index of refraction higher than the first index of refraction.

Example 3 includes the photonic semiconductor package of any one of examples 1-2, wherein the metallic material layer a material selected from the group consisting of gold, silver, coper, aluminum, and a titanium and nitrogen compound.

Example 4 includes the photonic semiconductor package of any one of examples 1-3, wherein the first dielectric material layer includes a material selected from the group consisting of a bismuth and oxygen compound, a silicon and oxygen compound, a silicon and nitrogen compound, and an indium and phosphorous compound.

Example 5 includes the photonic semiconductor package of any one of examples 1-4, wherein the second dielectric material layer is a material selected from the group consisting of silicon, an aluminum and gallium and arsenic compound, and an indium and gallium and arsenic compound.

Example 6 includes the photonic semiconductor package of any one of examples 1-5, further comprising a glass layer coupled to the layer furthest from the metallic material layer.

Example 7 includes the photonic semiconductor package of any one of examples 1-6, further comprising a polymer layer encapsulating the metallic material layer, the first dielectric material layer, and the second dielectric material layer.

Example 8 includes the photonic semiconductor package of any one of examples 1-7, further comprising a third dielectric material layer having a third index of refraction that is lower than the second index of refraction, wherein the third dielectric material layer is coupled to the second dielectric material layer, opposite the first low index dielectric material layer.

Example 9 includes the photonic semiconductor package of any one of examples 1-8, wherein the first dielectric material layer and second dielectric material layer are the same material.

Example 10 is a semiconductor device. The device includes a substrate, a semiconductor die coupled to the substrate, a photonic die, and a waveguide coupled to the photonic die. The waveguide includes a metallic material layer, a first low index dielectric material layer having a first index of refraction, and a high index dielectric material layer having a second index of refraction higher than the first index of refraction, wherein the first low index dielectric material layer is disposed between the metallic material layer and the and the high index material layer.

Example 11 includes the semiconductor device of example 10, further comprising a protective layer laminating the waveguide.

Example 12 includes the semiconductor device of any one of examples 9-11, wherein the substrate includes a glass layer coupled to the waveguide opposite the metallic material layer.

Example 13 includes the semiconductor device of any one of examples 9-12, further comprising a second low index dielectric material layer coupled between the high index dielectric material layer and the glass layer.

Example 14 includes the semiconductor device of any one of examples 9-13, further including a through glass via filled with a conductor, the conductor coupled to an electrical connection on the die.

Example 15 includes the semiconductor device of any one of examples 9-14, further comprising one or more other dielectric layers between the glass layer and the dies.

Example 16 includes the semiconductor device of any one of examples 9-15, wherein the waveguide is recessed within a cavity in the glass interposer.

Example 17 includes the semiconductor device of any one of examples 9-15, wherein the waveguide includes one or more bends.

Example 18 includes the semiconductor device of any one of examples 9-17, further comprising an additional polymer waveguide connecting the photonic die and the waveguide.

Example 19 includes the semiconductor device of any one of examples 9-18, further comprising an air via connecting the photonic die and the waveguide.

Example 20 is a method of forming a waveguide. The method includes forming a first low index dielectric material layer on a glass substrate, forming a high index dielectric material layer on the first low index material layer, forming a second low dielectric index material layer on the high index material layer, forming a metal layer on the second low index dielectric material layer, forming a resist layer on the metal layer, removing a portion of the resist layer to define the waveguide, removing exposed portions of the metal layer, the second low index dielectric material layer, and an upper portion of the high index dielectric material layer, and removing the remaining resist layer.

Example 21 includes the method of example 20, wherein the first low index dielectric material layers, second low index dielectric material layer, and high index dielectric material layer are formed by plasma enhanced chemical vapor deposition.

Example 22 includes the method of any one of examples 19-21, wherein the exposed portions of the metal layer, the second low index dielectric material layer, and an upper portion of the high index dielectric material layer are removed by reactive ion etching.

Example 23 includes the method of any one of examples 19-22, further comprising a forming a protective layer on the waveguide.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The foregoing description, for the purpose of explanation, has been described with reference to specific example embodiments. However, the illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others skilled in the art to best utilize the various example embodiments with various modifications as are suited to the particular use contemplated.

It will also be understood that, although the terms "first," "second," and so forth may be used herein to describe various elements, these elements should not be limited by these terms. These terms are only used to distinguish one element from another. For example, a first contact could be termed a second contact, and, similarly, a second contact could be termed a first contact, without departing from the scope of the present example embodiments. The first contact and the second contact are both contacts, but they are not the same contact.

The terminology used in the description of the example embodiments herein is for the purpose of describing particular example embodiments only and is not intended to be limiting. As used in the description of the example embodiments and the appended examples, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

What is claimed is:

1. A semiconductor device, comprising:
a glass layer;
a photonic die; and
a waveguide in a cavity recessed from a surface of the glass layer, wherein the waveguide is coupled to the photonic die and includes:
a metallic material layer,
a first dielectric material layer having a first index of refraction, and
a second dielectric material layer having a second index of refraction higher than the first index of refraction,
wherein the first dielectric material layer is between the metallic material layer and the second dielectric material layer.

2. The semiconductor device of claim 1, further comprising an additional dielectric material layer over the metallic material layer, wherein the metallic material layer is between the additional dielectric material layer and the first dielectric material layer.

3. The semiconductor device of claim 1, wherein the second dielectric material layer is closer to the glass layer than the metallic material layer.

4. The semiconductor device of claim 3, further comprising a third dielectric material layer having a third index of refraction lower than the second index of refraction, wherein the third dielectric material layer is between the second dielectric material layer and the glass layer.

5. The semiconductor device of claim 1, wherein the glass layer further includes a through glass via comprising a conductor material.

6. The semiconductor device of claim 1, wherein the glass layer is a glass interposer.

7. The semiconductor device of claim 6, further comprising a polymer waveguide coupled between the photonic die and the waveguide.

8. The semiconductor device of claim 6, further comprising an air via coupled between the photonic die and the waveguide.

9. The semiconductor device of claim 6, wherein the cavity has 60-80 degree taper angles.

10. The semiconductor device of claim 1, wherein the waveguide has one or more bends.

11. A semiconductor device, comprising:
a substrate comprising a cavity; and
a waveguide in the cavity, the waveguide comprising:
a metallic material layer,
a first dielectric material layer having a first index of refraction, and a second dielectric material layer having a second index of refraction higher than the first index of refraction, wherein the first dielectric material layer is between the metallic material layer and the second dielectric material layer.

12. The semiconductor device of claim 11, wherein:
the substrate includes a glass interposer, and
a distance between the glass interposer and the second dielectric material layer is smaller than a distance between the glass interposer and the metallic material layer.

13. The semiconductor device of claim 11, wherein:
the substrate includes a glass interposer, and
the second dielectric material layer is between the first dielectric material layer and the glass interposer.

14. The semiconductor device of claim 11, wherein the cavity has 60-80 degree taper angles.

15. The semiconductor device of claim 11, wherein the first dielectric material layer is in contact with the metallic material layer.

16. The semiconductor device of claim 11, wherein the first dielectric material layer has a thickness between 5 nanometers (nm) and 50 nm.

* * * * *